(12) United States Patent
Brady et al.

(10) Patent No.: US 6,793,544 B2
(45) Date of Patent: Sep. 21, 2004

(54) CORROSION RESISTANT FUEL CELL TERMINAL PLATES

(75) Inventors: Brian K. Brady, North Chili, NY (US); Bhaskar Sompalli, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/358,697

(22) Filed: Feb. 5, 2003

(65) Prior Publication Data

US 2004/0151952 A1 Aug. 5, 2004

(51) Int. Cl.$^7$ ................................................ H01R 3/08
(52) U.S. Cl. .......................... 439/886; 439/887; 429/29
(58) Field of Search ................................ 439/886–887; 429/29, 30, 32, 41

(56) References Cited

U.S. PATENT DOCUMENTS

| | | | |
|---|---|---|---|
| 4,447,109 A | * 5/1984 | Hobart, Jr. | 439/851 |
| 4,747,783 A | * 5/1988 | Bellamy et al. | 439/59 |
| 5,129,143 A | * 7/1992 | Wei et al. | 29/885 |
| 5,316,507 A | * 5/1994 | Capp | 439/886 |
| 5,578,388 A | 11/1996 | Faita et al. | |
| 5,624,769 A | 4/1997 | Li et al. | |
| 5,776,624 A | 7/1998 | Neutzler | |
| 6,007,390 A | * 12/1999 | Cheng et al. | 439/886 |
| 6,103,413 A | 8/2000 | Hinton et al. | |
| 6,218,089 B1 | 4/2001 | Pierrat | |
| 6,352,454 B1 | * 3/2002 | Kim et al. | 439/886 |
| 6,372,376 B1 | 4/2002 | Fronk et al. | |

FOREIGN PATENT DOCUMENTS

EP 1035608 2/2000

OTHER PUBLICATIONS

Michael C. Kimbel, Alan S. Woodman, and Everett B. Anderson, Physical Sciences, Inc., Andover, MA, Characterization of Corrosion–Protective Methods for Electrically Conductive Coatings on Aluminum, American Electroplaters and Surface Finishers Society, AESF SUR/FIN '99 Proceedings, Jun. 21–24, 1999, pp. 1–12.

* cited by examiner

Primary Examiner—Truc T. T. Nguyen
(74) Attorney, Agent, or Firm—Cary W. Brooks, Esq.; Linda M. Deschere, Esq.

(57) ABSTRACT

The present invention relates to an electrochemical cell having a terminal collector plate element that conducts electrical current from the stack. The terminal plate has an electrically conductive region and an electrically non-conductive region of the surface. The non-conductive region is coated with a corrosion resistant coating that comprises either a passivation layer, a corrosion-resistant polymeric layer, or both. Optionally, the conductive region of the terminal plate may be protected from oxidation, by coating with an oxidation-resistant metal layer. The oxidation-resistant layer may be further coated with a conductive oxidation-resistant polymeric layer. Other preferred aspects of the present invention include methods of treating the terminal plate to resist corrosion and oxidation while still maintaining electrical conductivity.

27 Claims, 3 Drawing Sheets

CORROSION RESISTANT FUEL CELL TERMINAL PLATES

FIELD OF THE INVENTION

The present invention relates to PEM fuel cells and, more particularly, to corrosion-resistant terminal collector plates and methods for making the same.

BACKGROUND OF THE INVENTION

Fuel cells have been proposed as a power source for electric vehicles and other applications. One known fuel cell is the PEM (i.e., Proton Exchange Membrane) fuel cell that includes a so-called "membrane-electrode-assembly" comprising a thin, solid polymer membrane-electrolyte having an anode on one face of the membrane-electrolyte and a cathode on the opposite face of the membrane-electrolyte. The anode and cathode typically comprise finely divided carbon particles, having very finely divided catalytic particles supported on the internal and external surfaces of the carbon particles, and proton conductive material intermingled with the catalytic and carbon particles.

The membrane-electrode-assembly is sandwiched between a pair of electrically conductive contact elements which serve as current collectors for the anode and cathode, and may contain appropriate channels and openings therein for distributing the fuel cell's gaseous reactants (i.e., $H_2$ & $O_2$/air) over the surfaces of the respective anode and cathode.

Bipolar PEM fuel cells comprise a plurality of the membrane-electrode-assemblies stacked together in electrical series while being separated one from the next by an impermeable, electrically conductive contact element known as a bipolar plate or septum. The septum or bipolar plate has two working faces, one confronting the anode of one cell and the other confronting the cathode on the next adjacent cell in the stack, and each bipolar plate electrically conducts current between the adjacent cells. Contact elements at the ends of the stack are referred to as end, terminal, or collector plates. These terminal collectors contact a conductive element sandwiched between the terminal bipolar plate and the terminal collector plate.

As can be seen, the terminal collector plate serves many functions, including, sealing the stack, providing electrical conductivity, permitting ingress and egress of fluids, and providing a stable material between the stack and the external environment. There remains the challenge to optimize as many of these functions as possible, and as cost-effectively as possible.

SUMMARY OF THE INVENTION

The present invention provides an electrochemical cell stack having a terminal collector end plate that has both an electrically conductive and a non-conductive region. The non-conductive region contains at least one aperture for fluid communication into and out of the stack. The non-conductive region is coated with a protective coating that is corrosion-resistant. Such a coating may comprise a passivation layer, a corrosion-resistant polymeric coating, or both.

In another embodiment of the present invention, the electrically conductive region of the terminal plate is coated with a conductive protective layer, comprising a conductive oxidation resistant metal layer. Optionally, the oxidation resistant metal layer may be further coated with a conductive oxidation-resistant polymeric coating.

Another aspect of the present invention includes methods for treating the terminal plate to provide corrosion resistance in the non-conductive region. Further aspects of methods of treatment include protecting the conductive region of the terminal plate with an oxidation resistant polymer coating that contains conductive particles.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention contemplates a terminal collector end plate (hereinafter "terminal plate") in an electrochemical fuel cell stack that uses a lightweight corrosion susceptible conductive material having an electrically conductive region and a non-conductive region, wherein the non-conductive region is treated to resist corrosion and minimize surface conductivity. Further, another aspect of the present invention contemplates an electrically conductive region of the terminal plate coated with a conductive oxidation-resistant protective coating. First, to better understand the present invention, a description of an exemplary fuel cell and stack are provided herein.

Figure 1:
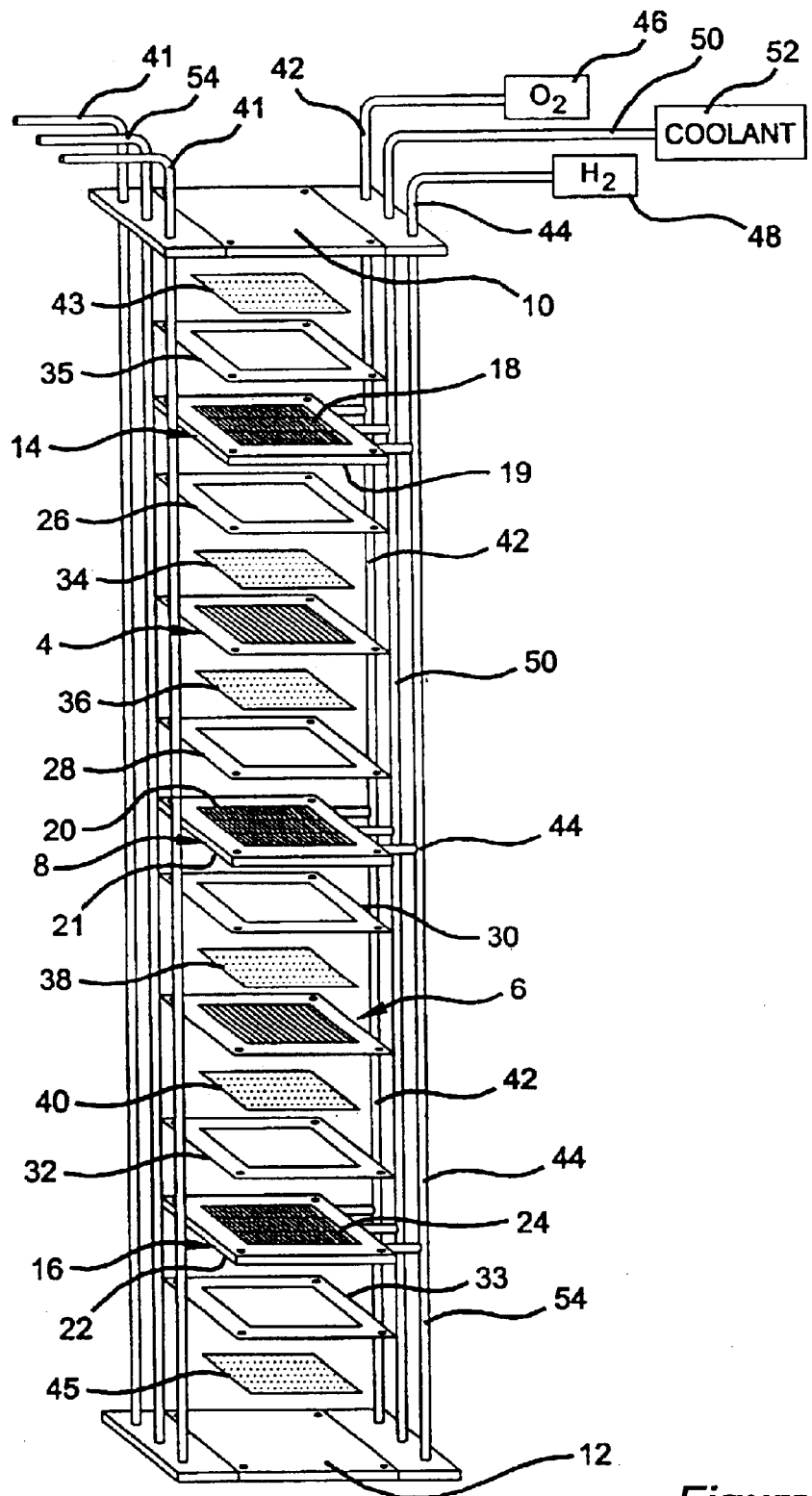
FIG. 1 is a schematic illustration of two cells in a liquid-cooled PEM fuel cell stack.

FIG. 1 depicts two individual proton exchange membrane (PEM) fuel cells connected to form a stack having a pair of membrane-electrode-assemblies (MEAs) 4 and 6 separated from each other by an electrically conductive, liquid-cooled, bipolar separator plate 8. An individual fuel cell, which is not connected in series within a stack, has a separator plate 8 with a single electrically active side. In a stack, a preferred bipolar separator plate 8 typically has two electrically active sides 20, 21 within the stack, each active side 20, 21 respectively facing a separate MEA 4, 6 with opposite charges that are separated, hence the so-called "bipolar" plate. As described herein, the fuel cell stack is described as having conductive bipolar plates, however the present invention is equally applicable to stacks having only a single fuel cell.

The MEAs 4, 6 and bipolar plate 8, are stacked together between stainless steel clamping terminal plates 10 and 12, and end contact fluid distribution elements 14 and 16. The end fluid distribution elements 14, 16, as well as both working faces of the bipolar plate 8, contain a plurality of lands adjacent to grooves or channels on the active faces 18, 19, 20, 21, 22, and 24 for distributing fuel and oxidant gases (i.e., $H_2$ & $O_2$) to the MEAs 4, 6. Nonconductive gaskets or seals 26, 28, 30, 32, 33, and 35 provide seals and electrical insulation between the several components of the fuel cell stack. Gas-permeable conductive diffusion media 34, 36, 38, and 40 press up against the electrode faces of the MEAs 4, 6. Additional layers of conductive media 43, 45 are placed between the end contact fluid distribution elements 14, 16 and the terminal collector plates 10, 12 to provide a conductive pathway therebetween when the stack is compressed during normal operating conditions. The end contact fluid distribution elements 14, 16 press up against the diffusion media 34, 40 respectively, while the bipolar plate 8 presses up against the diffusion media 36 on the anode face of the MEA 4, and against diffusion media 38 on the cathode face of MEA 6.

Oxygen is supplied to the cathode side of the fuel cell stack from storage tank 46 via appropriate supply plumbing 42, while hydrogen is supplied to the anode side of the fuel cell from storage tank 48, via appropriate supply plumbing 44. Alternatively, air may be supplied to the cathode side from the ambient, and hydrogen to the anode from a methanol or gasoline reformer, or the like. Exhaust plumbing 41 for both the $H_2$ and $O_2$/air sides of the MEAs is also provided. Additional plumbing 50 is provided for circulating coolant from a storage area 52 through the bipolar plate 8 and end plates 14, 16 and out the exit plumbing 54.

Isometric exploded views of a bipolar plate (such as number 8) are shown in U.S. Pat. No. 6,372,376 to Fronk, et al. As appreciated by one of skill in the art, a bipolar plate can be used as a single fuel cell conductive plate, which is bounded internally by the MEA and externally by the terminal plates, where a coolant field may be used along an active face.

Selection of the material of construction for the terminal plates 10 includes weighing such parameters as overall density (mass and volume), contact resistance at the surface, bulk conductivity, and corrosion and oxidation resistance. Thus, the important considerations for a terminal plate material include surface and bulk intrinsic conductivity of the material to perform as an electrical current collector in the conductive regions, while withstanding any corrosive conditions in the non-conductive fluid transport region. Previous materials have included lightweight metals comprising titanium or aluminum. Aluminum is a particularly desirable metal for use within a terminal plate, due to its high intrinsic bulk electrical conductivity, low surface resistance, and relatively low weight. However, aluminum tends to oxidize during operation of an $H_2$—$O_2$/air PEM fuel cell in electrically active or conductive contact areas. Such oxidation forms an oxide layer at the surface that impermissibly increases surface resistance. Further many lightweight metals are susceptible to corrosive attack, and in light of such corrosion sensitivity and propensity for oxidation, various protective coatings are used. However, often such protective coatings increase the electrical resistance of the metal plate to unacceptable levels or are expensive, such as with gold or platinum coatings. Thus, there is a trade-off between conductivity and corrosion protection.

According to one aspect of the present invention, it is possible to treat a terminal plate 10 made of a corrosion susceptible material so that it can withstand corrosion and oxidative attack, thus allowing for use of a metal that has less surface contact resistance and greater bulk conductivity for its weight relative to other more corrosion-resistant metals. Incorporation of such corrosion susceptible materials improves the overall gravimetric efficiency (i.e., efficiency per unit of mass) of the fuel cell stack.

Figure 2:
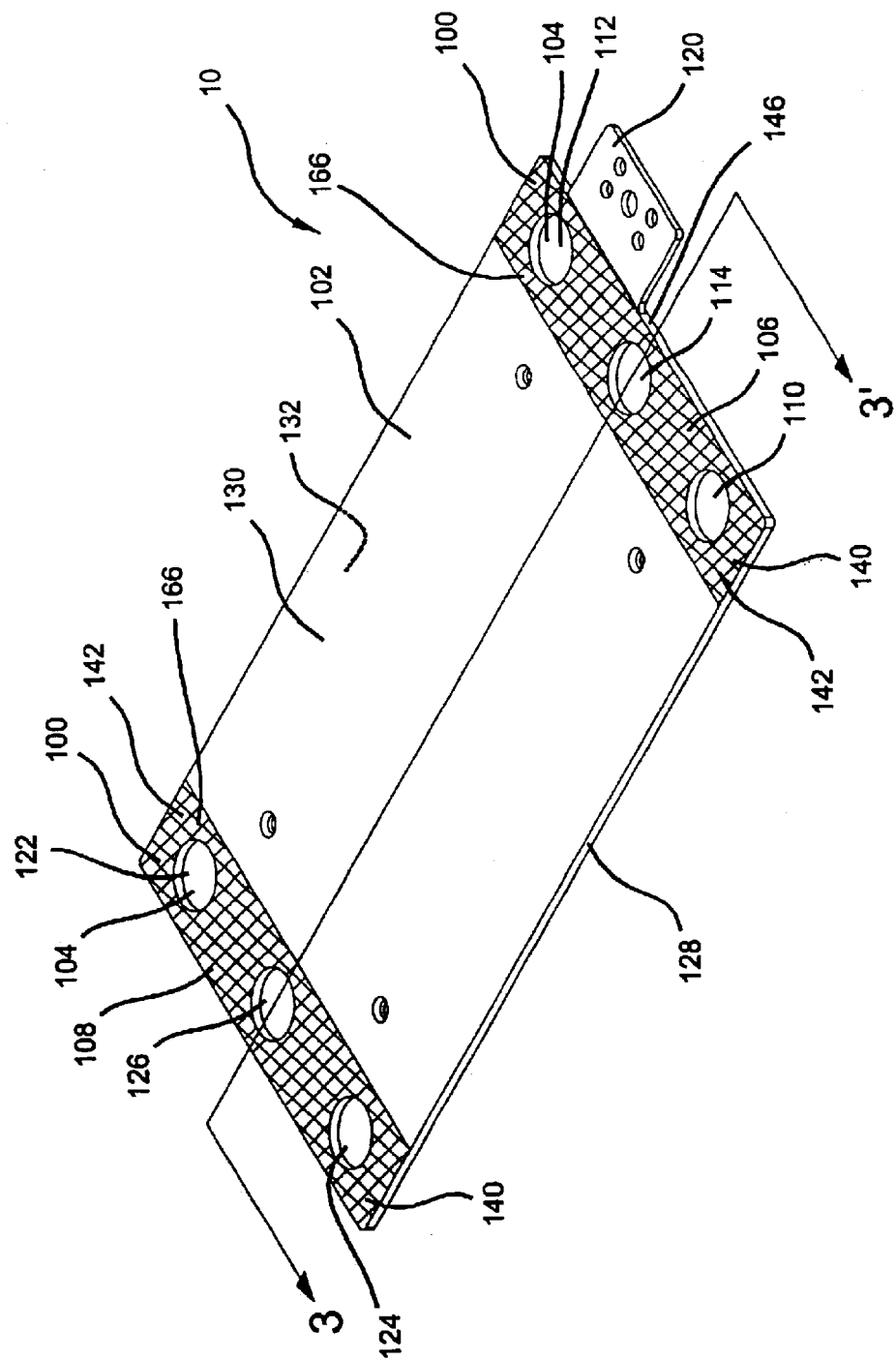
FIG. 2 is an exemplary terminal collector end plate showing a preferred embodiment of the present invention.

As shown in FIG. 2, a terminal collector end plate 10 has an electrically non-conductive region 100, as well as an electrically conductive region 102. The conductive regions 102 of the terminal plate 10 are typically separated from the non-conductive region 100 by sealing gaskets 33,35 (FIG. 1). However, if the gaskets 33, 35 fail due to corrosion, corrosive liquids may migrate into the conductive region 102 and leach aluminum ions. These aluminum ions can then migrate into the stack and the individual fuel cells. Such aluminum ions are detrimental to catalysts in the MEA, as the ions can occupy catalyst sites, reducing the performance of the cell and the entire stack.

Apertures 104 within the non-conductive region 100 extend through the body, or substrate, 128 of the terminal plate 10 permit fluid transport both into and out of the stack during operating conditions. Various fluids entering the stack include a hydrogen-containing gas, an oxygen-containing gas, and a liquid coolant (e.g. a mixture of ethylene glycol and water). Thus, on a first side 106 of the terminal plate 10, a first aperture 110 delivers hydrogen containing gas from the exterior of the stack from a storage or generation point 48 (FIG. 1) into the interior of the stack for the anode of at least one MEA, a second aperture 112 delivers oxygen containing gas into the interior of the stack for the cathode of at least one MEA from the oxygen storage or collection point 46 (FIG. 1), and a third aperture 114 delivers liquid coolant into the interior of the stack for cooling the regions inside the bipolar or end contact plates from the storage point 52 (FIG. 1).

The particular quantity or sequence of the apertures 104 is not limiting, and is merely exemplary as described herein, as numerous configurations are possible as recognized by one of skill in the art. A bipolar plate flow field design may dictate the inlet and outlet aperture configurations and fluid delivery placement. In one preferred embodiment, the first side 106 has a collector tab 120 facing upwards with the opposite side 108 facing downwards to maximize the effect of gravity on the liquid coolant assisting its movement as it enters the interior of the stack. On the second side of the terminal plate 108, a fourth aperture 122 transports anode effluent from the interior to the exterior of the stack, a fifth aperture 124 transports cathode effluent out of the stack, and a sixth aperture 126 transports coolant that has passed through at least one bipolar plate within the interior of the stack out of the stack. Thus, exposure of the underlying metal substrate 128 to the fluids entering and exiting the stack promotes corrosion of the non-conductive region 100 of the terminal plate 10, especially in the harsh conditions occurring on the "wet side" (i.e., the side facing a cathode of an internal fuel cell) of the stack. Further, it is believed that due to the terminal plate 10 being polarized to high positive voltages while being exposed to various pressurized gases, acid attack and oxidation are accelerated and promote corrosion of the terminal plate 10 substrate, although such theories are not limiting of mechanisms by which the terminal plate 10 corrodes.

The terminal plate 10 has surfaces 130, 132 of the substrate 128 and according to a preferred embodiment of the present invention, the non-conductive regions 100 of the terminal plate 10 are treated for protection from both oxidation and acid-attack via a prophylactic corrosion-resistant protective coating 140. One variation is to use different coatings to protect only certain apertures, and not all of them such as anode, cathode, coolant, ingress apertures only, and such as egress apertures only, or both. However, this selectivity adds to the cost and complexity. Corrosion-resistant refers to a material's reduced susceptibility to corrosion including chemical attack mechanisms such as: oxidation (i.e., inadvertent electrochemical reaction), acid attack, or both. "Relatively" corrosion resistant refers to a material's ability to better resist corrosion when compared with other similar materials, resulting in a lower corrosion rates and a longer lifespan.

In accordance with a preferred embodiment of the present invention as shown in FIG. 2, the exposed surfaces 130, 132 of the non-conductive region 100 are passivated. Passivation, as used herein, generally refers to a process of treating a metal to render the surface less chemically reactive or prone to corrosion. Surfaces exposed to a hostile or corrosive environment in the fuel cell are passivated to form a passivation layer 142 on the surfaces 130, 132 of the non-conductive region 100. One preferred passivation process is anodization of an aluminum metal substrate 128. Anodization is well known in the art, and generally refers to a conversion process where a metal is electrochemically coated with a protective film that renders the plate electrochemically inert. In a preferred embodiment of the present invention, the anodization forms a surface layer of metal oxide, such as aluminum oxide, that is significantly less electrochemically reactive than the base metal, metallic aluminum. Thus, passivated metal is far more resistant to corrosion. Further, the aluminum oxide layer facilitates better adhesion of subsequent applications of coatings. This minimizes potential flaws in the coating, such as pinholes which expose areas of uncoated metal. These pinholes arise as small, unprotected regions of the metallic surface, and have the potential to become growth sites for corrosion. Such sites may further expand at the surface, thus, the passivation layer on the surface minimizes the occurrence of such defects, by increasing corrosion resistance and also adhesion of any subsequently applied layers.

Many different methods of aluminum anodization are well-known in the art. Selecting an anodization process depends on the alloy properties and the protection layer needed for operating conditions in the cell. By way of example, one anodization process uses chromic acid on aluminum to form aluminum oxide and is described in more detail in "Metals Handbook", 8th Edition, Vol. 2, p. 621 (American Society for Metals, 1964). Depending on the anodization method used, the duration of processing to form the passivation layer 95 varies from about five minutes to over 4 hours. The resulting film thickness varies, then, from 5 $\mu$m to greater than 700 $\mu$m. In an alternate preferred embodiment a chemical conversion coating may be used to passivate the surface of the metal where the metal is converted to a less active species in an oxidation-reduction chemical reaction.

Minimizing the impedance of electrical conductivity in the conductive regions of the terminal plate is important to maintain the fuel cell power output. An electrochemically inert passivation layer 142 coating the conductive region 102 may diminish the electrical conductivity of the terminal plate 10 within the fuel cell because the conductive region 102 is the primary conductive pathway for electricity generated within the fuel cell stack. Electricity travels from the MEAs 4, 6 (FIG. 1) to the respective bipolar or end contact plates (e.g. conductive fluid distribution elements) 8, 14, 16 and then through conductive media 43, 45 to the terminal collector plates 10, 12, building a cumulative electrical potential across the stack from one terminal plate 10 to the opposite terminal plate 12. The collector tab 120 placed at the periphery 146 of one side 106 of the terminal plate 10 transmits electricity from the conductive region 102 to the collector tab 120 through the conductive metal body 128 of the terminal plate 10. A cable or lead (not shown) is attached to the collector tab 120, while an oppositely charged cable or lead is attached to the other collector tab at the opposite side of the stack. Thus, the conductive region 102 and the collector tab 120 must maintain sufficient surface conductivity for proper operation of the fuel cell. A passivation layer 142 may render the surface relatively insulative by diminishing surface conductivity, however, it does not impact the bulk or intrinsic conductivity through the body 128. In a preferred embodiment of the present invention, only the non-conductive region 100 that is susceptible to corrosion has a passivation layer 142 as a protective coating 140, which protects it from acid attack and oxidation, while still allowing electrical charge to flow within the body 128 of the terminal plate 10 from the conductive region conductive 102 to the collector tab 120.

Figure 3:
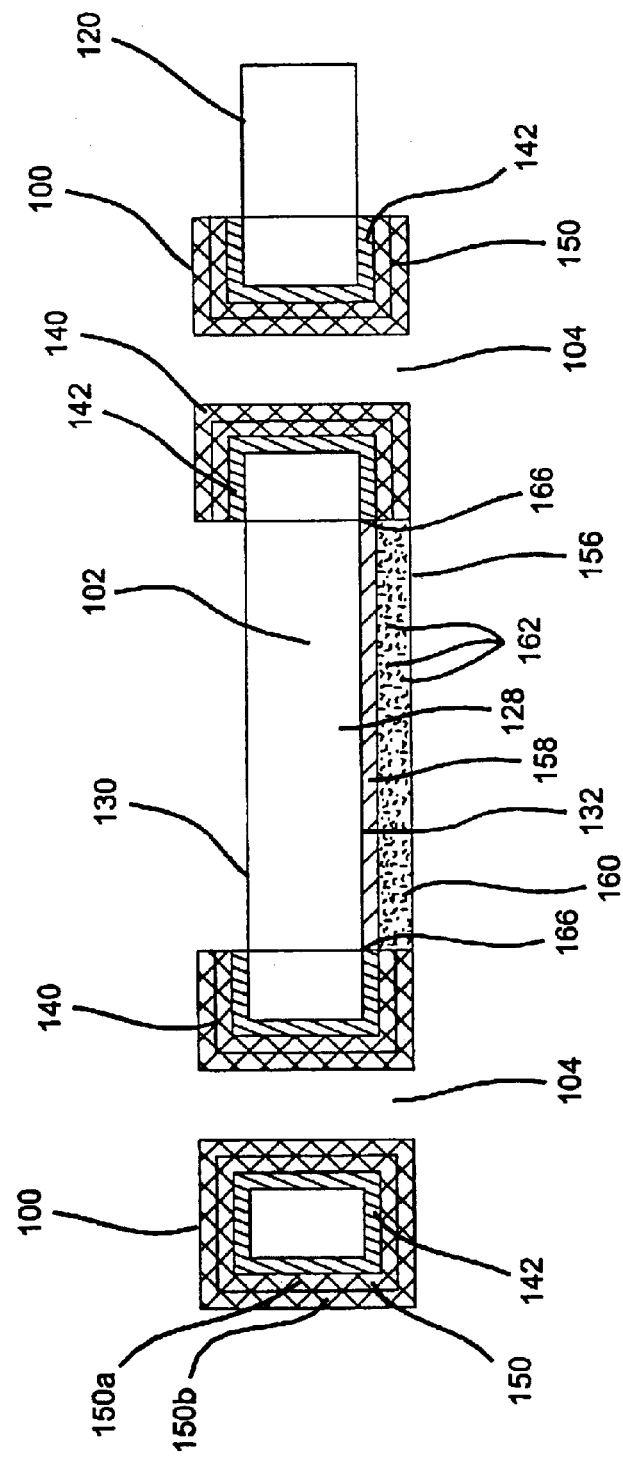
FIG. 3 is a cross-sectional view taken along line 3–3' of FIG. 2, showing the surface of a terminal collector end plate of a preferred embodiment of the present invention.

In another aspect of a preferred embodiment of the present invention the protective coating 140 comprises a polymeric coating 150, applied to the non-conductive region 100 surfaces 130, 132 as shown in FIG. 3, a cross-sectional view taken along line 3–3' in FIG. 2. The non-conductive region 100 of the surfaces 130, 132 of the terminal plate 10 may be coated with a non-conductive polymer. The increased surface electrical resistance of the non-conductive region 100 of the terminal plate 10, does not impact electrical conductivity through the body 128 of the terminal plate 10. Also contemplated are multiple layers of polymeric coating 150a, 150b, which may afford greater corrosion protection for the underlying surfaces 130, 132 as the thickness increases.

The polymer, or mixtures of polymers, forming the polymeric coating 150 are selected for compatibility with the metallic substrate surfaces 130, 132 of the terminal plate 10, as well as for its corrosion-resistance. Such a polymer comprises any polymer that is water-insoluble when cross-linked or cured, which can form a thin adherent film to the metallic substrate 128 beneath, and that can withstand the hostile oxidative and acidic environment of the fuel cell. Hence, polymers, such as epoxies, silicones, polyamide-imides, polyetherimides, polyphenols, fluoro-elastomers (e.g., polyvinylidene fluoride), polyesters, phenoxy-phenolics, epoxide-phenolics, acrylics, and urethanes, inter alia are seen to be useful with the present invention. Cross-linked polymers are preferred for producing impermeable coatings that provide corrosion-resistant properties.

In one preferred embodiment of the present invention, only the non-conductive region 102 receives the protective coating 140. The conductive region 102 and the collector tab 120 surfaces are covered or masked while the terminal plate 10 is protected, e.g. subjected to passivation. A mask is any material that is applied to a substrate and remains stable during passivation and/or polymer application. Such materials may include photomasks typically constructed of opaque materials. Thus, the protective coating 140 is formed only over the non-conductive region 100 of the cell. Areas along the edges of the masks 166 may have some passivation layer or oxide formation, and optionally, these areas 166 may be cleaned to remove any oxide present by mechanical abrasion, chemical etching, or a similar method.

When the terminal plate 10 is constructed of a corrosion susceptible material, such as aluminum, the electrically conductive region 102 may suffer from oxidative attack creating an undesirable aluminum oxide layer that increases contact resistance at the surface 132. Such oxide layers significantly reduce power output and operational efficiency of the stack. One aspect of the present invention is application of a conductive region protective coating 156 covering the conductive region 102 of the terminal plate 10.

In a preferred embodiment of the present invention, the conductive region protective coating 156 comprises an oxidation-resistant metal 158 that resists oxidation better than the underlying substrate metal 128 and protects the substrate 128 from oxidation. Oxidation-resistant refers to a material inhibiting oxidation better than the underlying metal can resist oxidation. Application of the metal layer 158 can be done using conventional physical vapor deposition (PVD) techniques (e.g. magnetron sputtering) or chemical vapor deposition (CVD) known to those skilled in these arts. Also plating processes, both electrolytic and electroless, are useable to apply these types of metallic coatings.

The surface 132 may be prepared prior to the metal layer 158 deposition by removing any impurities or naturally existing oxide layers on the surface by mechanical, chemical, or electrochemical means. Removal of natural oxides from the entire conductive region 102 substrate surface 132 ensures that the subsequent oxidation resistant coating 156 will be adherent. A layer of an oxidation resistant metal 158, such as platinum, gold, nickel, tin, silver, alloys thereof, mixtures thereof and equivalents thereof, maintains the desirable surface conductivity with a relatively low contact resistance, while preventing the formation of oxide layers that impede electrical conductivity. Metal layers 158 comprising nickel are particularly preferred. In one preferred aspect, electroless-applied nickel is used as a sub-layer under the particle-filled polymer coating.

When exposed to certain internal stack environments, an oxidation resistant metal layer 158 over the substrate 128 may require further protection to prevent oxide layers from forming. An alternate preferred embodiment of the present invention includes an electrically conductive region protective coating 156 that comprises a polymer containing conductive oxidation-resistant coating 160 applied over the oxidation resistant metal layer 158. During operation of the fuel cell, the terminal plate 10 is clamped to compress the several stack components against one another, via clamping means such as bolts extending through the stack. Thus, the terminal plate 10 conductive region 102 is physically separated from the non-conductive region by sealing gaskets 33, 35, during normal operations. However, when exposed to corrosive conditions, the gaskets may degrade or fail allowing fluid communication between the conductive and non-conductive regions 102, 100. The corrosive liquids on the non-conductive region 100 may migrate into the conductive region 102. Thus, such a polymer containing conductive oxidation-resistant coating 160 also safeguards against leached aluminum ions poisoning the catalysts within the stack by prophylactically coating the conductive region 102 substrate 128 with a corrosion and oxidation-resistant coating 160.

A preferred polymer containing conductive oxidation-resistant coating 160 includes a base polymer or mixtures of polymers, similar to polymers selected for the non-conductive coating 150 applied to the non-conductive region 100, as discussed above, but further includes conductive particle fillers 162 to permit the necessary conductivity. The polymer containing conductive oxidation-resistant coating 160 must be electrically conductive, typically having a resistivity less than about 50 ohm-cm. Depending on the characteristics of the polymer selected, the polymer containing conductive oxidation-resistant coating 160 may optionally further comprise oxidation-resistant, acid-insoluble, electrically conductive particles 162 (i.e., less than about 50 μm) dispersed throughout the conductive region oxidation-resistant coating 160. These conductive particles 162 enable electrical conductivity through the conductive region protective coating 156. Corrosion and oxidation resistant polymers containing a plurality of electrically conductive filler particles are further described in U.S. Pat. No. 6,372,376 to Fronk, et al.

The conductive particles 162 are selected from the group consisting of: gold, platinum, graphite, carbon, nickel, conductive metal borides, nitrides and carbides (e.g., titanium nitride, titanium carbide, titanium diboride), titanium alloys containing chromium and/or nickel, palladium, niobium, rhodium, rare earth metals, and other noble metals. Most preferably, the particles 162 will comprise carbon or graphite (i.e., hexagonally crystallized carbon). The particles 162 comprise varying weight percentages of the polymer containing conductive oxidation-resistant coating 160 depending on both the conductive characteristics of the polymer itself (determining the extent of conductivity needed) and further the density and conductivity of the particles 162 (i.e., particles having a high conductivity and low density can be used in lower weight percentages). Carbon/graphite containing conductive coatings 160 will typically contain 25 percent by weight carbon/graphite particles 162.

The non-conductive region and conductive region polymer containing conductive oxidation-resistant coatings (150, 160) may be applied to the conductive region 102 substrate surface 132 in a number of ways, e.g., (1) electrophoretic deposition (2) brushing, spraying or spreading, (3) laminating, or (4) powder coating. Powder coatings of polymeric substances 150, 160 are particularly preferred because they can be efficiently deposited with little waste, can coat surfaces with a pre-existing polymer layer, have less porosity, and can be deposited substantially uniformly in thicker layers than other methods of polymer application. Powder coating is well known in the art and useful to coat a variety of conductive and non-conductive substrates by charging dry polymeric particles with voltages generally above 80 kV, as they exit a sprayer (e.g. Teflon® lined or Corona). A variety of polymers may be applied with this method, including without limitation, epoxies, polyamides, and polyimides. Powder coating is particularly well suited to applying the non-conductive region corrosion-resistant polymeric layer 150, where two to three layers of polymer are applied to achieve a thickness within the range of approximately about 50–250 μm. Also, electrophoretic deposition is useful with conductive substrates, providing an efficient way of applying cathodic epoxies, acrylics, urethanes and polyesters. Subsequent baking of coated substrates crosslinks, and densities the coating applied either by powder coating or by electrophoretic deposition. The polymer application methods described herein can be used to apply both the non-conductive protective polymeric coating 150 over the non-conductive region 100 (i.e., without conductive particles), as well as the polymer containing conductive oxidation-resistant coating layer 160 over the conductive region 102 (i.e., with conductive particles) of the terminal plate 10.

An alternative method of applying the polymeric coatings (e.g. 150, 160) is first forming the polymer as a discrete film (e.g. by solvent casting, extrusion, etc.), and then laminating onto the working surface 130, 132 of the terminal plate 10, e.g., by hot rolling. The discrete film preferably contains a plasticizer to improve handling of the film in this method of application and provides a coating layer atop the substrate 128 that is supple enough so that the film will not be torn or disrupted when the terminal plate 10 is further processed. Fluoro-elastomers such as polyvinylidiene diflouride or the like are useful with this embodiment, and may be used with conventional plasticizers such as dibutyl phthalate.

Alternatively, the polymer film 150, 160 is applied to the working surface 130, 132 of the substrate 128 by spraying, brushing or spreading (e.g., with a doctor blade). A precursor of the coating is formed by dissolving the polymer in a suitable solvent, (optionally, conductive filler particles 162 can be mixed with the dissolved polymer and applied it as a wet slurry atop the substrate 132 when it is the polymer containing conductive oxidation-resistant coating 160. The wet coating is then dried (i.e., the solvent removed) and cured as needed (e.g., for thermosets). The conductive particles 162, when present, adhere to the substrate 128 by means of the solvent-free polymer.

A preferred polymer useful with this spraying, brushing, or spreading application comprises a polyamide-imide thermosetting polymer. The polyamide-imide is dissolved in a solvent comprising a mixture of N-methylpyrrolidone, propylene glycol and methyl ether acetate. To this solution is, optionally, added about 21% to about 23% by weight of a mixture of graphite and carbon black particles wherein the graphite particles range in size from about 5 $\mu$m to about 20 $\mu$m and the carbon black particles range in size from about 0.5 $\mu$m to about 1.5 $\mu$m with the smaller carbon black particles serving to fill the voids between the larger graphite particles and thereby increase the conductivity of the coating compared to all-graphite coatings. The mix is applied to the substrate 128 dried and cured to about 15–30 $\mu$m thick coatings 150, 160 (preferably about 17 $\mu$m) having a carbon-graphite content of about 38% by weight (if used). It may be cured slowly at low temperatures (i.e., <400° F.), or more quickly in a two step process wherein the solvent is first removed by heating for ten minutes at about 300° F.–350° F. (i.e., dried) followed by higher temperature heating (500° F.–750° F.) for durations ranging from about 30 seconds to about 15 minutes (depending on the temperature used) to cure the polymer.

A preferred method of treatment includes selecting a region (i.e., the non-conductive region 100) along a major surface 130, 132 of the body 128 for treatment. Prior to treatment, any non-selected regions (i.e., the conductive region 102) along the major surfaces 130, 132 of the body 128 are masked prior to applying the protective coating 140 on the non-conductive region 100. The protective coating 140 includes a passivation layer 142 and optionally a further conductive corrosion-resistant polymeric layer 150. One alternate embodiment of the present invention contemplates an optional treatment step where the terminal plate 10 has a passivation layer 142 and conductive polymeric layer 150 and is passivated to treat any pinholes that may underlie the protective coating 140, which could provide corrosion growth sites in the metal substrate 128. Additional passivation treats the metal underlying any pinholes occurring in the passivation layer 142 or polymeric layer 150, thus fortifying the protective coating 140. After application of the protective coating 140 on the non-conductive region 100, the mask (not shown) is removed from the conductive region 102. A new mask is placed over the freshly coated non-conductive region 100, where it is protected from subsequent treatment of the conductive region 102. The conductive region 102 may be further pre-processed by mechanical or chemical abrasion. Then, a conductive region protective coating 156 is applied over the conductive region 102, comprising an oxidation resistant metal layer 158 and a polymer containing conductive oxidation-resistant coating 160. After applying the conductive region protective coating 156 on the conductive region 102, the masks may be removed from the non-conductive region 100.

The present invention thus provides the ability to coat the non-conductive regions of a terminal plate made of a corrosion-susceptible material with a corrosion-resistant coating, while further optionally protecting the conductive region with a conductive coating, overcoming problems with rapidly expanding corrosion sites on the metal and undesirable oxidizing of electrically conductive portions of the surface, which would otherwise decrease the performance of the fuel stack.

While the invention has been described in the terms of specific embodiments thereof, it is not intended to be limited thereto but rather only to the extent set forth hereafter in the claims which follow. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electrically conductive terminal plate comprising:
   a body of conductive, corrosion-susceptible material;
   a surface of said body having an electrically conductive region and an electrically non-conductive region; and
   a corrosion-resistant layer overlaying said electrically non-conductive region;
   a tab in electrical contact with said body of conductive material underlying said electrically non-conductive region, and an electrically conductive path from said electrically conductive region through said conductive body underlying said electrically non-conductive region to the electrically conductive tab.

2. The terminal plate according to claim 1, wherein said electrically conductive region is centrally located on said surface of the terminal plate and said electrically non-conductive region circumscribes said central region.

3. The terminal plate according to claim 1, wherein said corrosion-resistant layer includes a passivation layer.

4. The terminal plate according to claim 1, wherein said corrosion-resistant layer includes a non-conductive polymeric coating.

5. The terminal plate according to claim 1, wherein said corrosion-resistant layer includes a passivation layer and a non-conductive polymeric coating.

6. The terminal plate according to claim 5, wherein said polymeric coating comprises at least one polymer selected from the group consisting of: epoxies, silicones, polyamide-imides, polyether-imides, polyphenols, fluoroelastomers, polyesters, phenoxy-phenolics, epoxide-phenolyics, acrylics and urethanes.

7. The terminal plate according to claim 1, wherein the terminal plate has at least one aperture through said body in said electrically non-conductive region, and wherein said aperture has a surface overlaid with said corrosion-resistant layer.

8. The terminal plate according to claim 1, wherein said corrosion-resistant layer of the aperture and said corrosion resistant layer of said non-conductive region are essentially continuous.

9. The terminal plate according to claim 1, wherein said body comprises aluminum.

10. The terminal plate according to claim 1, wherein said electrically conductive region is overlaid with a protective coating including a first layer in contact with said surface of said electrically conductive region comprising an oxidation-resistant metal, and a second layer over said first layer, said second layer comprising an oxidation-resistant polymer.

11. The terminal plate according to claim 10, wherein said oxidation-resistant metal comprises nickel, tin, silver, and alloys thereof, and combinations thereof.

12. The terminal plate according to claim 10, wherein said second layer further comprises electrically conductive particles dispersed in said oxidation-resistant polymer.

13. The terminal plate according to claim 12, wherein said electrically conductive particles are selected from a group consisting of: gold, platinum, nickel, palladium, rhodium, niobium, titanium, chromium, rare earth metals, graphite, carbon, compounds and alloys thereof, and mixtures thereof.

14. The terminal plate according to claim 10, wherein said oxidation-resistant polymer is selected from the group consisting of: epoxies, silicones, polyamide-imides, polyether-imides, polyphenols, fluoroelastomers, polyesters, phenoxy-phenolics, epoxide-phenolics, acrylics and urethanes.

15. A terminal plate for collecting current generated across one or more electrochemical cells in a stack, wherein each cell includes a membrane electrode assembly (MEA) sandwiched between a pair of electrically conductive fluid distribution elements, wherein electrical contact is established from the MEA through the conductive distribution elements, wherein the fluid distribution element nearest the terminal plate is in electrical contact with the terminal plate, said terminal plate comprising:

a body of conductive and corrosion-resistant material; and a surface of said body having an electrically conductive region in contact with said nearest fluid distribution element of the plate, and an electrically non-conductive region overlaid by a corrosion-resistant layer;

wherein said electrically conductive region is centrally located on said surface of the terminal plate and said electrically non-conductive region circumscribes said central region and defines a peripheral non-conductive region of the plate, thereby electrically isolating the plate from the surrounding environment; and a tab in electrical contact with said body of conductive material underlying said electrically non-conductive region, and an electrically conductive path from said electrically-conductive region through said conductive body underlying said electrically non-conductive region to the electrically conductive tab.

16. The terminal plate according to claim 15, wherein the terminal plate has at least one aperture through said body in said electrically non-conductive region, wherein said aperture is in fluid communication with the plurality of fluid distribution elements, and said aperture has a surface overlaid with said corrosion-resistant layer.

17. The terminal plate according to claim 15, wherein said corrosion-resistant layer includes a passivation layer.

18. The terminal plate according to claim 15, wherein said corrosion-resistant layer includes a non-conductive polymeric coating.

19. The terminal plate according to claim 14, wherein said corrosion-resistant layer includes a passivation layer and a non-conductive polymeric coating.

20. The terminal plate according to claim 19, wherein said polymeric coating comprises at least one polymer selected from the group consisting of: epoxies, silicones, polyamide-imides, polyether-imides, polyphenols, fluoroelastomers, polyesters, phenoxy-phenolics, epoxide-phenolics, acrylics and urethanes.

21. The terminal plate according to claim 15, Wherein said corrosion-resistant layer of the aperture and said corrosion-resistant layer of said non-conductive region are essentially continuous.

22. The terminal plate according to claim 15, wherein said body comprises aluminum.

23. The terminal plate according to claim 15, wherein said electrically conductive region is overlaid with a protective layer including a first layer in contact with said surface of said electrically conductive region comprising an oxidation-resistant metal, and a second layer over said first layer, said second layer comprising an oxidation-resistant polymer.

24. The terminal plate according to claim 23, wherein said oxidation-resistant metal comprises nickel, tin, silver, and alloys thereof, and combinations thereof.

25. The terminal plate according to claim 23, wherein said second layer further comprises electrically conductive particles dispersed in said oxidation-resistant polymer.

26. The terminal plate according to claim 25, wherein said electrically conductive particles are selected from a group consisting of: gold, platinum, nickel, palladium, rhodium, niobium, titanium, chromium, rare earth metals, graphite, carbon, compounds and alloys thereof, and mixtures thereof.

27. The terminal plate according to claim 23, wherein said oxidation-resistant polymer is selected from the group consisting of: epoxies, silicones, polyamide-imides, polyether-imides, polyphenols, fluoroelastomers, polyesters, phenoxy-phenolics, epoxide-phenolyics, acrylics and urethanes.

* * * * *